United States Patent

[11] 3,620,830

| [72] | Inventor | Arthur Kramer<br>South Euclid, Ohio |
|---|---|---|
| [21] | Appl. No. | 698,526 |
| [22] | Filed | Jan. 17, 1968 |
| [45] | Patented | Nov. 16, 1971 |
| [73] | Assignee | The Lincoln Electric Company<br>Cleveland, Ohio |

[54] AUTOMATIC ARC WELDING ELECTRODE WITH AN ELECTRICALLY CONDUCTIVE FLUX COATING
13 Claims, 3 Drawing Figs.

[52] U.S. Cl. ..................................... 117/204,
117/49, 117/50, 117/93, 117/205, 117/207,
219/146
[51] Int. Cl. ....................................... B23k 35/40
[50] Field of Search............................ 117/204,
202, 207, 93, 932, 128.4, 232, 47 H, 50, 49, 205;
219/145, 146

[56] References Cited
UNITED STATES PATENTS

| 1,898,933 | 2/1933 | Biers .............................. | 117/207 X |
| 2,158,984 | 5/1939 | Lytle et al. ..................... | 117/207 X |
| 2,248,104 | 7/1941 | Marini et al. .................. | 117/202 |
| 2,730,465 | 1/1956 | Van der Willigen .......... | 117/207 X |
| 2,824,817 | 2/1958 | Shutt ............................. | 219/146 X |
| 3,028,265 | 4/1962 | Wareham ...................... | 117/128.4 X |
| 3,102,827 | 9/1963 | Kriewall et al. ............... | 117/207 X |
| 3,235,405 | 2/1966 | Quaas ............................ | 117/207 X |

FOREIGN PATENTS

| 121,744 | 7/1946 | Australia ....................... | 219/146 |
| 1,351,604 | 12/1963 | France .......................... | 117/93 |
| 566,132 | 12/1944 | Great Britain ................ | 117/93 |
| 722,236 | 1/1955 | Great Britain ................ | 117/207 |
| 955,125 | 4/1964 | Great Britain ................ | 117/93 |

*Primary Examiner*—Alfred L. Leavitt
*Assistant Examiner*—J. H. Newsome
*Attorney*—Meyer, Tilberry and Body ABSTRACT: The invention consists of a continuous electric arc welding electrode of indefinite length consisting of a metal core and an outer coating which is electrically conductive so that the electrode can be energized by sliding it across conventional electrical contacts. The coating is comprised of: a mixture of an organic resin, which chars when heated to elevated temperatures; carbon or metal powders which conduct current through the resin; and, possibly other known fluxing ingredients. A thin outer metallic coating is often also used which conducts current from the contacts circumferentially and longitudinally to the electrically conductive coating.

PATENTED NOV 16 1971 3,620,830
SHEET 1 OF 2
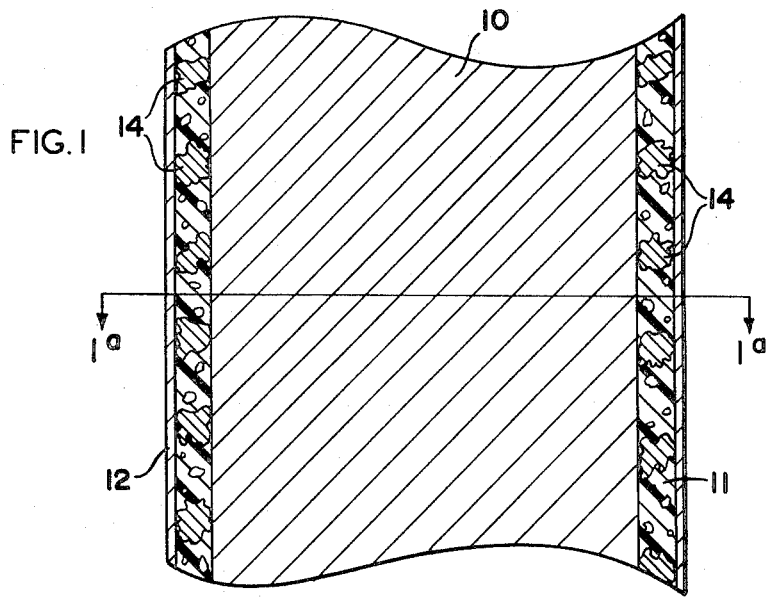
FIG.1
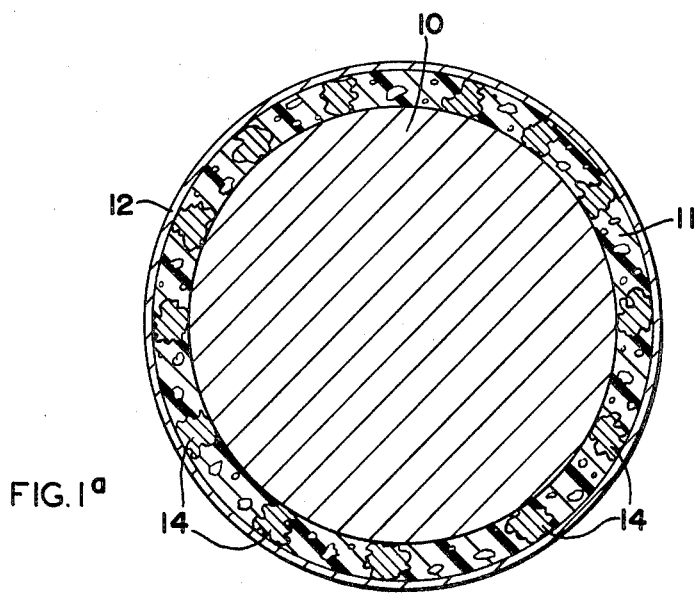
FIG.1ª
INVENTOR.
ARTHUR KRAMER
BY
Meyer, Tilberry & Body
ATTORNEYS.

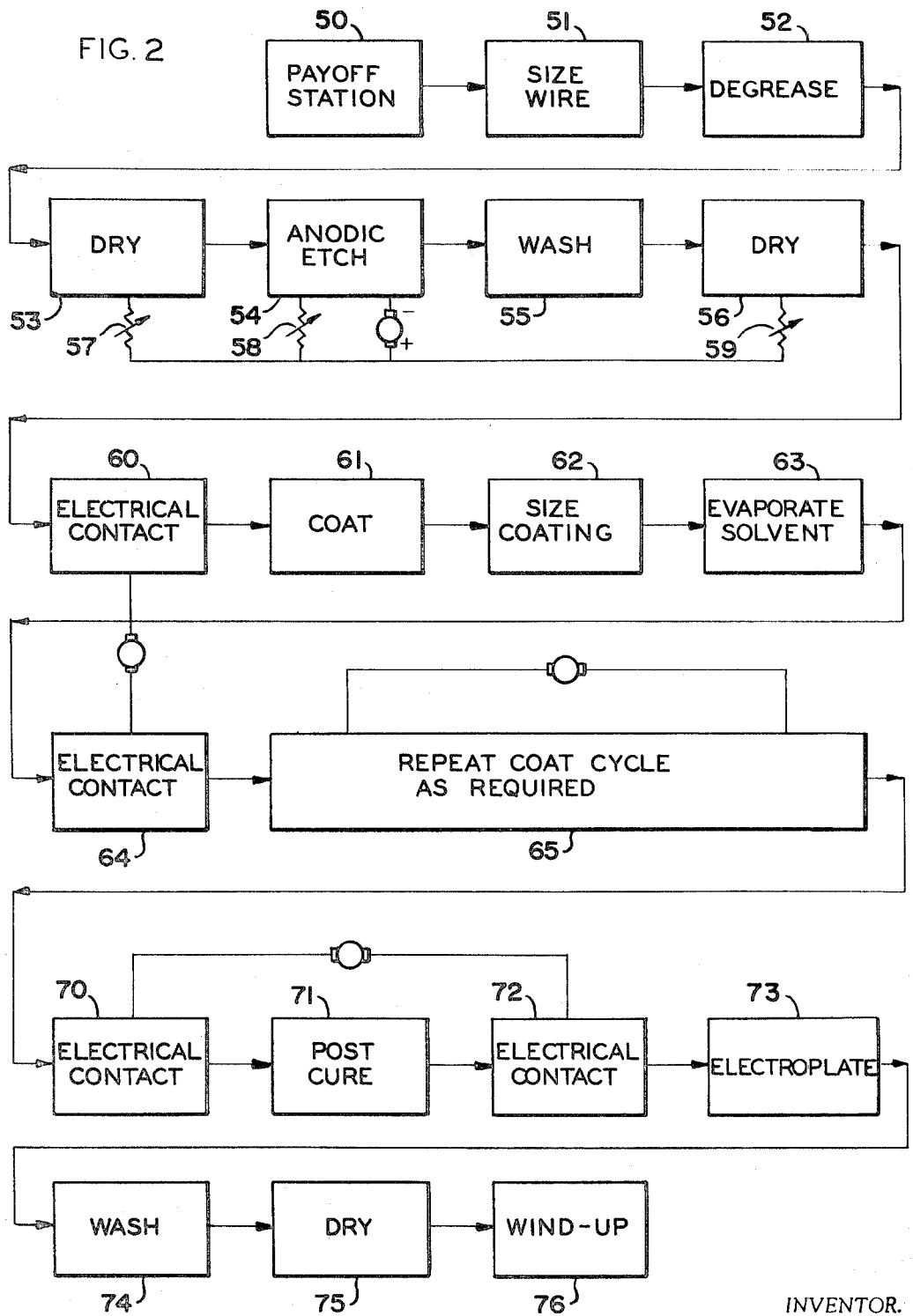

AUTOMATIC ARC WELDING ELECTRODE WITH AN ELECTRICALLY CONDUCTIVE FLUX COATING

This invention pertains to the art of electric arc welding and more particularly to a welding electrode in the form of a small diameter wire of indeterminate length having an electrically conductive flux coating which can be continuously fed toward the arc and electrically energized by sliding across an electrical contact located close to the arc.

The invention is particularly applicable to solid wire electrodes for welding low carbon steel and will be described with particular reference thereto although it will be appreciated that the invention is equally applicable for use with tubular or ribbon type electrodes or for welding other iron alloys as well as the nonferrous metals and alloys.

In the art of electric arc welding, it has always been necessary to provide some means to exclude air from the arc and weld pool as well as to supply certain ingredients to the arc and weld pool for improving, respectively, the size and stability of the arc plasma and metallurgical characteristics of the final weld bead. Originally this was done by placing a heavy coating of flux ingredients on a large diameter e.g. one-eighth inch or more wire stick and baring one end of this stick so that it could be electrically energized through fixed contacts on an electrode holder. Such electrodes were ideally suited for hand welding but were relatively expensive to use because they welded slowly and the bared end of the electrode or stub had to be thrown away.

Later, small diameter e.g. one-eighth inch or less bare wire of indeterminate length was employed which was energized by sliding across an electrical contact located close to the arc. The arc was then shielded from the atmosphere, either by granular flux deposited on the weld seam ahead of the electrode or by gases, such as the inert gases or carbon dioxide or a combination of both, enveloping the arc and weld pool. The gases required a complicated welding head, hoses and bulky tanks for holding the gas in the compressed state. The granular welding fluxes required special means for feeding the flux to the arc at a predetermined rate, were messy, required removal of the hardened slag from the bead and were generally limited to horizontal welds.

More recently, as described in U.S. Pat. No. 2,909,778, issued Oct. 20, 1959, and owned by the assignee of this application, the fluxing ingredients were placed on the inside of a tube of indefinite length so that for the first time, particularly in low carbon steel welding, it was possible to weld continuously without any externally supplied gases or fluxes.

Efforts have been made in the past to place the fluxing ingredients on the outside of a metal wire while still energizing it by sliding it across an electrical contact. Thus, in one instance, the wire surface has been grooved or otherwise shaped or roughened and the flux pressed into the depressions caused by the roughening, leaving portions of the wire surface exposed for engagement with the electrical contact. In another instance, the flux has been coated on the wire in such a manner so as to leave a continuous bare strip which can be energized by sliding across an electrical contact. In a third instance, the flux has been placed all around the wire and the contacts have had knife edges to cut through the coating. Such arrangements have proven expensive to manufacture and difficult to use in practice.

The present invention contemplates a small diameter flux coated welding electrode of indeterminate length which overcomes all of the above referred to difficulties, and others, which can be energized as it moves toward the arc with conventional fixed electrical contacts located close to the arc so that continuous automatic and semiautomatic arc welding can be carried out simply and economically without the use of shielding gases or independently supplied fluxes. This is not to infer, however, that the present invention cannot be used effectively and to advantage with a tubular, shaped or roughened core or with the use of shielding gases or independently supplied fluxes.

In accordance with the present invention, a welding electrode is provided comprised of a metallic core of indefinite length having an external coating comprised of one or more thin layers of a mixture of a cured organic resin and fine particles of an electroconductive carbon and/or metallic power in sufficient quantities to appreciably lower the inherent electrical resistance of the resin such that significant quantities of current can readily be conducted from external contacts to the core. This coating per se or plus additional ingredients may be considered a flux.

By "flux" is meant a composite of metallic and/or nonmetallic ingredients which act beneficially in the arc welding operation to assist in obtaining a sound, well shaped weld bead of desired mechanical properties. The flux may do this by one or more of the following: vaporizing in the heat of the arc to form a gas which protects the arc and molten pool from the atmosphere; controlling the stability, temperature, size, shape, current density distribution or voltage gradient of the arc; acting to negate the deleterious effects of gases or other undesirable materials dissolved in, on or near the molten weld pool up to the time of complete solidification; and/or contributing alloying materials to the weld bead.

By an "organic resin" is meant: the natural resins, any of a large class of synthetic products usually of high molecular weight that have some of the physical properties of natural resins, cellulose derivatives, and protein products, that may be thermoplastic or thermosetting, that are made by polymerization, condensation, addition, plasticization, interaction of naturally occurring substances or their derivatives with each other or with synthetic products, or in some manner by solvent evaporation and that are used chiefly as plastics, or the essential ingredients of plastics, in varnishes and other coatings, in thickeners, and in adhesives.

The transfer of welding currents on the order of 10 to 1,000 amperes from the contacts through the electrically conductive coating can result in severe localized heating in the coating. In addition to this, electrode heating is produced by virtue of the electrode coming into physical contact with the energizing electrical contact block which itself becomes heated during welding. Because of this heating, the resin, if of a thermoplastic type, can attain sufficiently high temperatures that it melts or becomes soft, gummy, or sticky such that it clogs the contact area to the point where it becomes difficult or impossible to properly feed the electrode through the contact tip or conduct the desired amount of current to the core. One way to avoid these problems is to design a specially cooled contact tip. Another way, and a way preferred by this invention because of its simplicity, is to use an organic resin in the coating of the charring type.

By an "organic resin of the charring type" is meant a cured thermosetting organic resin within the above definition which, upon being heated substantially above its polymerization temperature, chars or carbonizes as distinguished from melting, turning soft, gummy or sticky. Typical organic resins falling within this classification are the unsubstituted and substituted phenol and creosol formaldehydes themselves or blended with various amounts of polyvinyl butyral (Butvar) and polyvinyl formal (Formvar).

The organic resin serves a triple function in this invention. First, with or without a solvent, it serves as a liquid vehicle for the other flux ingredients when they are being applied to the core. Second, when cured, it serves as a tough flexible binder to hold the other flux ingredients in position on the electrode while the electrode is coiled, uncoiled and finally fed through an automatic or semiautomatic welding machine. Third, it reacts or decomposes in the heat of the arc to produce an atmosphere of hydrocarbon fragments, water vapor, carbon monoxide, carbon dioxide and/or other gases which excludes or helps exclude the atmosphere from the arc and molten weld pool or otherwise contributes beneficially to the welding process.

By an "electroconductive carbon powder" is meant a carbon powder having minimal electrical resistivity such as the conductive oil furnace carbon blacks. These carbon powders have a large ratio of surface area to particle diameter and the mean particle diameter is in the lower millimicron range. Also, these carbon powders have a very high oil absorption index. Electron micrographs suggest that these carbon blacks consist of particles having the shape of filaments. These carbon powders serve to provide conductivity to the coating and also burn in the heat of the arc to form a gas which helps to exclude the atmosphere or in some other way beneficially effect the welding process. A typical carbon powder meeting these requirements is Vulcan XC 72R manufactured by Cabot Corporation of Boston, Mass.

In accordance with this invention, any metal or metalloid powders can be used in the coating which is beneficial to or at least is not detrimental to the weld bead characteristics if present in controlled amounts. For example, with a steel core the coating might contain one or more of the following: aluminum, chromium, iron, lithium, magnesium, manganese, molybdenum, nickel, rare-earths, silicon, titanium, vanadium, zirconium or the like. With a copper core the coating might contain manganese, nickel, silver, tin or the like. With an aluminum core the coating might contain calcium, lithium, magnesium, manganese, silicon or the like. The above metals and metaloids could be used pure or as alloys or both.

The particle size of the metal powders should be such as to maximize the electrical conductivity of the coating. One way this can be accomplished is by using sized metal and metaloid particles whose mean diameter approaches that of the final cured coating thickness of the electrode. The surface of the particles should be reasonably clean, that is to say substantially free of oxides and other nonconductive coatings. This does not mean, however, that metal or metaloid particles with contaminated surfaces could not be used to advantage in the flux coating.

The size of the particles determines the minimum thickness of the coating as measured by a micrometer which, of course, reads only the diameter of the peaks caused by these particles even though the diameter of the valleys between the peaks may be somewhat less. A particle size of 1.7 to 2.9 mils for a 3.0 mil thick coating is preferred. If the coating is applied in two or more coating steps, then the particle size for the additional layers should be less than 1.7 mils. It is to be noted that the particle size of the first layer generally determines the coating thickness. The additional layers simply fill in the valleys between the peaks without appreciably increasing the coating thickness as measured by a micrometer, although by proper die selection greater thicknesses can be built up.

Further, in accordance with the invention, the coating may contain metallic and/or metallic materials which have been added to influence in some way the stability, temperature, size, shape, voltage gradient, or current density distribution of the arc plasma. These include a group of materials known to the welding trade as "arc stabilizers," e.g. alkali and alkaline earth oxides, silicates, titanates, zirconates, carbonates, and the like.

The coating may also contain other ingredients often employed in welding rod coatings or tubular welding electrode cores, e.g. silicon dioxide, magnesium oxide, manganese ores, rutile, calcium carbonate, calcium fluoride, and the like. These ingredients are normally slag forming materials, but if they are used sparingly the workpiece is free of a slag except for a slight dust.

The coating may also contain various organic materials in addition to the organic resins heretofore mentioned which have been added either because they impart special properties to the physical or mechanical nature of the flux coating or because they contribute to the welding process per se, e.g. cellulose, fluorocarbons such as polytetrafluoroethylene polymers, and the like. These materials are generally solids and are added to the liquid resin as a powder.

Still further in accordance with the invention, an outer metallic coating can be provided on the outside of the resin bonded layers which provides electrical continuity between the conductive particles projecting through the surface of the resin. This coating substantially raises the electrical conductivity in a radial direction relative to the core. It should be pointed out that the outer metallic coating is a preferred form of the invention and is not a necessary requirement for current transfer. This outer metallic coating serves primarily to receive the electric current from the energizing contact tip and distribute the current longitudinally and circumferentially around the outer surface of the coating to the randomly located metallic and/or the electrically conductive carbon particles which then conduct the current radially inwardly to the metallic core. This coating can be made of copper, iron, nickel, and the like. It is preferably a very thin or flash coating but could be made sufficiently thick to carry a significant portion of the welding current.

Further in accordance with the invention, a method of curing an electrically conductive organic coating is provided which consists of passing the metal core over an electrical contact, then through a station at which the coating is applied by one of many methods known to the art and which in the preferred form of the invention consists of passing the core through a mass of a mixture comprised of liquid organic resin, and electrically conductive particles, and then over a remotely located second electrical contact, energizing the electrical contacts so that current flows through the wire and heats it causing the vaporization of any solvents present and/or the polymerization of the organic resin before the now coated wire reaches the second contact. The coating is sufficiently conductive to conduct the necessary current from this second contact to the wire core. This method of cure is not only unique but extremely desirable since it cures the coating in a radial direction from the core to the outside of the electrode.

Furthermore, it is believed that a necessary condition for the high speed and thereby economic manufacture of this electrode is the evaporation of the solvents and other volatile components of the mixture after it is coated onto the wire core in such a manner that these high vapor pressure materials can freely evolve from the surface of the coating while it is still in a soft semifluid state. This is done by heating the wire itself by passing an electric current through the wire core in a longitudinal direction so that in effect the radially inner portions of the coating are heated first and a coating temperature gradient is established in which the temperature is highest at the core interface and is always decreasing in a radially outward direction. It follows, therefore, that the volatile components of the coating will evolve from the radially inner portions first and can pass freely through the still fluid radially outer portions. If, on the other hand, the coated wire is heated only by externally applied heat such as radiant heat or hot air, the volatile components are evolved first from the outer radial surfaces of the coating. This results in a relatively impermeable surface film through which the volatile components from the inner radial portions of the coating must diffuse. Curing with external heat along requires very long solvent evaporation times to avoid a vapor pressure buildup of volatile components behind the tough surface film which, in turn, results in the nucleation and growth of gas bubbles producing porosity in the coating. Porosity in the flux coating produces low density, low strength coating with relatively high electrical resistance. The preferred method of curing precludes the formation of the longitudinal and circumferential shrinkage cracks and coating porosity which occur frequently when wire coatings are cured with external heat alone. Furthermore, air of a desired temperature is directed against the coating surface in the solvent evaporation and cure chambers. This is done not only to remove solvents and/or byproducts of curing but also to control the temperature and fluidity of the outer coating surface and therefore more completely control the desirable decreasing curing gradient which is established in a radially outward direction in the coating.

The principal object of the invention is the provision of a welding electrode of any desired length consisting of a metallic core and a coaxial flux coating which can be readily used by sliding over an electrical contact and which does not require the use of externally supplied gases or independently supplied fluxes.

Another object of the invention is the provision of a new and improved coating for welding electrodes wherein the coating has sufficient electrical conductivity that the welding current will pass from an external electrical contact through the coating to the core.

Still another object of the invention is the provision of a new and improved coating for welding electrodes which is electrically conductive and which will act to protect the arc and weld metal from the atmosphere.

Still another object of the invention is the provision of a new and improved way of curing an electrically conductive resin coating on a wire core which is rapid, readily controlled, economical and which produces a flexible and adherent coating which is free of shrinkage cracks and porosity.

The invention may take physical form in the composition of the coating mixture, the physical arrangement of some of the ingredients of the coating and in the method of applying and curing the coating on the electrode core, preferred embodiments of which will be described in detail in this specification and illustrated in the accompanying drawings which form a part of this specification and wherein:

FIG. 1 is a schematic, fragmentary, section view of an electrode illustrating a preferred embodiment of the invention greatly enlarged;

FIG. 1a is a cross-sectional view thereof; and,

FIG. 2 is a block diagram flow sheet of a preferred method of making an electrode illustrating a preferred embodiment of the invention.

Referring now to the drawings wherein the showings are for the purposes of illustrating preferred embodiments of the invention only and not for purposes of limiting the same, FIG. 1 shows a sectional view of a welding electrode having an electroconductive resin bonded flux coating system. The drawing is schematic and the coating thicknesses have been exaggerated for the purpose of clarity in illustrating a preferred embodiment of the invention. An examination of FIG. 1 reveals a metal core 10 surrounded coaxially with a first coating 11 consisting of a flux mixture formulated in accordance with the invention, and a second coaxial coating 12, external to the first coating, which is comprised of an electrically conductive metal. The first coating 11 contains metallic and non metallic particles 14.

The core 10 may be of any desired metal such as copper, nickel, chromium, titanium, aluminum, or alloys consisting of these and/or other metals. In the preferred embodiment, however, the core is made of ordinary low carbon steel having the usual residual amounts of carbon, manganese, silicon and other desirable elements together with trace impurities. The core is a solid cylinder of an indeterminate length and any desired diameter, but as the welding current normally increases with core diameter and as the current carrying capacity of the coating decreases with increased thickness, there must necessarily be a balancing of the two. A core diameter of one thirty-second inch to three thirty-second inch is preferred. Obviously, the core diameter can be larger or smaller.

In the preferred embodiment the flux coating does not exceed 10 mils in thickness and 25 weight percent of the total electrode weight. The flux coating 11 can be one of many combinations of the necessary ingredients. In general, the composition of a flux coating will be determined by the intended purpose of the welding electrode. The composition of the flux coating in the preferred embodiment can be defined by the following limits:

| Type of component | Wt. percent of cured coating | Wt. percent of electrode |
|---|---|---|
| Organic resin | 10 to 30 | 0.10 to 7.5. |
| Electrically conductive carbon | 1 to 15 | 0.01 to 3.8. |
| Conductive metallic powders | 60 to 90 | 0.60 to 23.0. |
| Non-conductive powders | 0 to 30 | 0 to 7.5. |

The outer metallic coating 12 in the preferred embodiment consists of an electroplate of nickel and/or iron in amounts usually less than 1.0 weight percent of the electrode weight.

The coating 11 may consist of one or more identical layers or a plurality of separate layers, each differing in composition from the others by desired amounts. A greater weight of coating may be obtained by using multiple layers without an appreciable increase in apparent coating thickness or resistivity. This may be in part explained by the fact that with a single layer, the apparent electrode diameter is determined by particles which project slightly above the surface of the resin itself after curing. The second layer then fills in the valleys between these projections. Multiple coatings also increase the speed of manufacture.

A more specific example of the preferred embodiment is a flux coating of the approximate composition:

ELECTRODE A

| | Dry weight percent of coating | Weight percent of cured electrode |
|---|---|---|
| Innermost coating I: | | |
| Polyvinyl formal resin | 8.4 | 0.19 |
| Creosol formaldehyde resin | 5.6 | 0.12 |
| Electrically conductive oil furnace carbon black [1] | 4 | 0.09 |
| Alloy A [2] (1.7 to 2.9 mil size) | 62 | 1.36 |
| Alloy B [2] (1.7 to 2.9 mil size) | 20 | 0.44 |
| Total | 100.0 | 2.20 |
| Second coating II: | | |
| Polyvinyl formal resin | 8.4 | 0.06 |
| Creosol formaldehyde resin | 5.6 | 0.04 |
| Electrically conductive oil furnace carbon black | 4 | 0.03 |
| Lithium silicate | 10 | 0.08 |
| Alloy C [2] (less than 1.7 mil size) | 72 | 0.58 |
| Total | 100.0 | 0.79 |
| Outermost coating III: | | |
| Nickel (electroplate) | | .46 |
| Total resin bonded coating | | 3.45 |
| Steel core wire | | Bal. |

[1] Vulcan XC 72R manufactured by Cabot Corporation.
[2] Alloy, composition:
   A:—Ti 29%, Mn 24.3%, Si 17.4%, Al 1.8%, Fe balance.
   B:—Mn 67%, Si 19%, C 1.5%, Fe balance.
   C:—C 3.8%, Mn 0.4%, Si 0.2%, Fe balance.

Coating I is first built up on a 1/16-inch diameter steel core to 2.2 dry weight percent and coating II is built up to a total cured coating weight of 2.99 of the electrode. The nickel outer coating is then applied so that the final coating weight is 3.45 percent and the final diameter of the electrode is 65 mils. Typical mechanical properties obtained by Electrode 21 can be found in table I.

A second specific example of the preferred embodiment is a coating of the following approximate composition:

ELECTRODE B

| | Dry weight percent of coating | Weight percent of cured electrode |
|---|---|---|
| Polyvinyl formal resin | 7 | 0.21 |
| Creosol formaldehyde resin | 7 | 0.21 |
| Electrically conductive oil furnace black [1] | 4 | 0.12 |
| Alloy D [2] (1.7 mil max. particle size) | 46 | 1.43 |
| Alloy E [2] (1.7 mil max. particle size) | 20 | 0.62 |
| Iron powder | 11 | 0.34 |
| Lithium silicate | 5 | 0.16 |
| Total | 100 | 3.09 |
| Outermost coating V: | | |
| Nickel (electroplate) | | .52 |
| Total resin bonded coating | | 3.61 |
| Steel core wire | | Bal. |

[1] Vulcan XC 72R manufactured by Cabot Corporation.
[2] Alloy composition:
   D—Ti 29.0%, C 0.2%, Si 22.0%, Al 1.5%, Fe balance.
   E—Mn 80.0%, C 7.0%, Si 1.0%, Fe balance.

Coating IV is first built up on a 1/16-inch diameter steel core to 3.09 dry weight percent coating by means of two applications of the same material. The final diameter of the electrode is 65 mils. Typical mechanical properties obtained by the electrodes have been presented in table I.

While there is given above a preferred embodiment and specific examples of this invention, it should be understood that these are not intended to be in any way exhaustive or limiting of the invention.

The mechanical properties of 100 percent weld metal deposited by the above two specific examples of this invention are presented below:

TABLE I.—TYPICAL MECHANICAL PROPERTIES OF 100% WELD METAL

|  | Electrode A | Electrode B |
| --- | --- | --- |
| Yield point, p.s.i.[1] | 82,300 | 89,500 |
| Tensile strength, p.s.i.[1] | 97,500 | 102,000 |
| Elongation in 2 inches, percent [1] | 18 | 17 |
| Impact, ft. lbs.[2]: |  |  |
| 75° F | 27 | 38 |
| 0° F | 14 | 17 |
| −30° F | 6 | 10 |

[1] Obtained on standard 0.505 diameter specimens which were aged for 48 hours at 220° F.
[2] Obtained on standard unaged "V" notch specimens.

FIG. 2 shows a block diagram illustrating a preferred process for the manufacturing of the electrode of FIG. 1. The wire 10 is supplied at a payoff station 50. It is drawn through a die 51 which accurately sizes it to the desired diameter. In order to insure the coating 11 be in intimate physical electrical contact with the surface of the wire core 10, the wire 10 is first subjected to a degreasing operation to remove residual drawing lubricants 52, dried 53, and then an anodic etch with an electrolyte of dilute sulfuric acid 54, followed by a wash 55, and a drying 56. The drying at stations 53 and 56 is accelerated by passing some of the current required for the anodic etch 54 to the wire by means of a contact wheel, one in each of the drying stations 53, 56, the amount of current being controlled by resistors 57, 58, 59.

The wire 10 then passes over an electrical contact 60, through a coating tank 61 containing a fluid mixture of the desired coating material and through a sizing die 62 which accurately establishes the desired thickness of the coating on the wire. A floating type die is employed so that the coating will be uniformly concentric.

The coated wire 10 then passes through a solvent evaporation chamber 63 in which a countercurrent of air removes the solvents from the coating surface. This air is always maintained at a temperature lower than the external surface of the coating. This control maximizes solvent evaporation from the flux coating without causing the formation of a surface film. The partially cured coating then passes over a second electrical contact wheel 64 forming the return circuit to contact 60. This cycle may be repeated as at 65 as many times as required to build up the desired thickness of coating. The additional coatings may be of the same composition or may be modified as required. After the flux coating is built up to the desired weight percentage, the coated wire passes over an electrical contact 70, through an isothermal post cure chamber 71 and over contact 72. The wire currents and air temperatures must be carefully controlled to obtain optimum cures. Undercured coatings appear to be thermoplastic since they become soft and gummy when fed through the contact tip of the welding gun and therefore make it difficult or impossible to properly feed the electrode while welding. Overcured coatings tend to form a poor bond with the wire core 10 and the electroplated coating 12 thus causing a flaking or spalling of coatings 11 and 12.

The completely cured coated wire then passes into a Watts nickel plating bath 73 where it receives the external coating 12. The plated electrode is washed 74, dried 75, and is level wound 76 onto a reel for shipment.

An electrode as above described has been found to have sufficiently low resistance between its outer surface and the inner core that electric welding currents can be satisfactorily fed into the inner core 10 by sliding the electrode across a contact tip located close to the arc and satisfactory weld beads can be obtained by welding in air without the need for any externally supplied shielding gases or welding fluxes. Thus, the resin bonded flux coating decomposing in the heat of the arc is capable of protecting the arc and weld metal from the atmosphere or otherwise negating its deliterious effects.

While there is given above preferred embodiments and specific examples of this invention, it should be understood that these are not intended to be in any way exhaustive or limiting of the invention. In view of the many changes and modifications that may be made without departing from the principles underlying the invention, reference should be made to the appended claims for an understanding of the scope of the protection afforded by the invention.

Having thus described my invention, I claim:

1. A welding electrode of indefinite length comprised of a metal core and a continuous outer electroconductive coating, said electrode being capable of being wound onto an electrode reel and to have the total welding current conducted to the core through the coating as the electrode is moved past a fixed energizing contact, said coating being composed of at least one layer of a mixture of electrically conductive particles dispersed in a cured thermosetting organic resin binder of the charring type, said particles being present in sufficient amounts and having a size approximately equal to the thickness of a layer whereby the total welding current can be conducted directly from a sliding contact against the outer surface of the coating to said core by at least a majority of said particles.

2. The welding electrode as defined in claim 1 wherein said electrically conductive particles are composed essentially of one of more materials selected from the group consisting of electrically conductive carbon, metals and metalloids, and mixtures or alloys thereof.

3. The electrode of claim 2 wherein said metals are selected from the class consisting of aluminum, chromium, iron, lithium, magnesium, manganese, molybdenum, nickel, rare earths, silicon, titanium, vanadium and zirconium either as elements or alloys of each other.

4. The welding electrode of claim 1 wherein said binder is comprised of a blend of a resin selected from the group consisting of phenol formaldehyde resins, with a resin selected from the group consisting of polyvinyl butyral and polyvinyl resins.

5. The welding electrode as defined in claim 1 wherein said coating further comprises particles of one or more arc stabilizers, slag forming materials, or powdered organic resin materials.

6. The welding electrode as defined in claim 1 further comprising an outer metallic electrically conductive coating superimposed on said first mentioned coating.

7. The welding electrode as defined in claim 6 wherein said metallic coating is composed essentially of a metal selected from a class consisting of nickel, iron, copper.

8. The electrode of claim 1 wherein said coating has the following approximate composition in weight percent of cured coating:

| Organic resin | 10 to 30 |
| --- | --- |
| Electrically conductive carbon | 1 to 15 |
| Conductive metallic powders | 60 to 90 |
| Nonconductive powders | 0 to 30 |

9. The electrode of claim 1 wherein said coating has the following approximate composition in weight percent of the total electrode weight:

| Organic resin | 0.10 to 7.5 |
| --- | --- |
| Electrically conductive carbon | 0.01 to 3.8 |
| Conductive metallic powders | 0.60 to 23.0 |
| nonconductive powders | 0 to 7.5 |

10. A method providing a metallic welding electrode core with a heat-settable electrically conductive coating, comprising: moving the core along a prescribed path, applying a mixture of an uncured heat-curable resin and electrically conductive particles around the entire core, flowing an electric current from contacts located at longitudinally spaced points along the core to heat the core by $I^2R$ heating, at least one of these points being located before the coating is applied and the other being located after the coating has been applied and has at least partially cured, the total current at said other point flowing through the particles in the coating to the core, the current, the rate of movement of the core and the distance between the points of electrical contact being such as to at least partially cure said resin.

11. The method as defined in claim 10 wherein the coating contains a resin which is of a type that is heat-settable by addition, condensation or evaporation.

12. The method as described in claim 10 in which a thermal gradient is established in the uncured or partially cured coating in which the temperature is highest at the core interface and is always decreasing in a radially outward direction.

13. The method of claim 10 wherein the temperature ambient to the coated wire is maintained below the temperature which will cause the resin to heat set.

* * * * *